Patented July 29, 1941

2,251,042

UNITED STATES PATENT OFFICE 2,251,042

STERILIZATION PROCESS

Josef Eisenbrand and Hermann Picher, Frankfort-on-the-Main-Hochst, Germany, assignors to Winthrop Chemical Company, Inc., New York, N. Y., a corporation of New York No Drawing. Application September 17, 1938, Serial No. 230,517. In Germany September 18, 1937

8 Claims. (Cl. 167—52)

The present invention relates to a sterilization process: more particularly to a process which aims at preventing during the sterilization process the decomposition of solutions sensitive to heat.

The sterilization of solutions of pharmaceutically active substances by heat is often accompanied by decomposition phenomena which are due to the fact that the solutions have a pH-value which is required for their physiological compatibility and this pH-value is detrimental to the stability of the dissolved substances at a raised temperature. These phenomena are quite frequently observed in the case of solutions whose pH-value lies within the range of about 5 to about 8 which is the most important for therapeutical purposes.

Now we have found that this objection may be overcome by adding to the solution a substance which changes the pH-value of the heated solution in a manner favorable to the stability of the solution and allows restoration of the original pH-value of the solution on cooling after the sterilization. Substances of this kind are the salts of weak bases and strong acids or of strong bases and weak acids, for instance secondary sodium phosphate, tertiary sodium citrate, the ammonium salts of hydrochloric acid, hydrobromic acid and hydriodic acid, furthermore, the hydrochloride of ethylene-diamine. It will, of course, be understood that there are used as additional substances for solutions to be applied in therapeutics only such salts as do not cause any detrimental physiological effects.

According to the present invention a salt of a strong base and a weak acid is added to a solution of a substance which on heating is stable within a pH-range corresponding with a more strongly alkaline reaction than the pH-range which is suitable for the injection of the solution; on the other hand a salt of a strong acid and a weak base is added to a solution of a substance which on heating remains undecomposed in a strongly acid range. The desired effect may be attained even by the addition of small amounts of salts which generally do not amount to more than about 4 per cent. at the utmost. By suitable choice of the additional substances it is possible to avoid completely or nearly completely the decomposition phenomena which occur during the sterilization of such solutions; nevertheless the original physiologically favourable pH-value is reproduced in the cooled solution.

The following examples serve to illustrate the invention, but they are not intended to limit it thereto:

1. An aqueous solution of 1 per cent. strength of the hydrochloride of para-butylaminobenzoyldimethylaminoethanol containing 0.9 per cent. of sodium chloride shows when cold and when heated a pH-value of about 5.4. If such a solution is sterilized by boiling it for 4 hours, about 2.6 per cent. of the hydrochloride of para-butylaminobenzoyldimethylaminoethanol originally present is saponified.

If 0.8 per cent. of ammonium chloride is added to the same solution instead of sodium chloride, the pH-value of the cold solution is about 5.35 and that of the hot solution is about 4.0. After the solution has been boiled for 4 hours the saponification amounts only to about 1.1 per cent. After cooling, the solution again attains a pH-value of about 5.3.

2. An aqueous solution of 0.05 per cent. strength of the hydrochloride of ortho-dihydroxyphenylpropanolamine containing 0.8 per cent. of sodium chloride shows a pH-value of 5.9 which is reduced to about 4.8 on heating the solution. On sterilization by heat the originally colorless solution becomes pink.

If 0.8 per cent. of ammonium chloride is used instead of the sodium chloride the pH-value is about 5.7 to 5.8 before and after the sterilization of the solution, which even after having been heated remains colorless.

Similar results are obtained with 1-ortho-dihydroxyphenylethanolmethylamine.

3. An aqueous solution of 1.25 per cent. strength of the sodium salt of dimethylaminomethylphenyl-phosphinic acid containing 0.8 per cent. of sodium chloride shows before being heated a pH-value of about 7.6 and after being heated a pH-value of about 6.2. The saponification after the sterilization with application of heat amounts to about 5.2 per cent. of the quantity of the sodium dimethylaminomethylphenyl-phosphinate originally present.

If 0.4 per cent. of sodium chloride and 1 per cent. of secondary sodium phosphate are added to an aqueous solution of 1.25 per cent. strength of sodium dimethylaminomethylphenyl-phosphinate it shows before and after having been heated a pH-value of about 8.8. The saponification amounts only to about 0.033 per cent.

By replacing the secondary sodium phosphate by 1.25 per cent. of sodium citrate, the pH-value of the solution is about 7.8 before and after heating. The saponification amounts to about 0.098 per cent.

We claim:

1. A solution which comprises a pharmaceutically active substance selected from the group consisting of the hydrochloride of para-butyl-amino-benzoyldimethylamino ethanol, the hydrochloride of ortho-dihydroxyphenylpropanolamine and the sodium salt of dimethylaminomethylphenyl-phosphenic acid, and a salt selected from the group consisting of salts of weak acids and strong bases and salts of strong acids and weak bases, which salt imparts to the solution at sterilization temperature a pH value at which it is stable but permits the solution to revert to a pH value appropriate to physiological compatibility at atmospheric temperature.

2. A process of sterilizing by heat a solution of a pharmaceutically active substance selected from the group consisting of the hydrochloride of para-butylamino-benzoyldimethylamino ethanol, the hydrochloride of ortho-dihydroxyphenylpropanolamine and the sodium salt of dimethylaminomethylphenylphosphenic acid which comprises adding to the solution a salt selected from the group consisting of salts of weak acids and strong bases and salts of strong acids and weak bases which imparts to the solution at sterilization temperature a pH-value at which it is stable, but permits the solution to revert to a pH-value appropriate to pharmaceutical application at atmospheric temperature, and heating the solution to a temperature at which it is sterilized.

3. A solution in accordance with claim 1 which contains the hydrochloride of para-butylamino-benzoyldimethylamino ethanol and a small amount of ammonium chloride.

4. A solution in accordance with claim 1 which comprises the hydrochloride of ortho-dihydroxyphenylpropanolamine and a small amount of ammonium chloride.

5. A solution in accordance with claim 1 which comprises the sodium salt of dimethylaminomethylphenyl-phosphenic acid and a small amount of secondary sodium phosphate.

6. A process in accordance with claim 2 in which the solution contains the hydrochloride of ortho-dihydroxyphenylpropanolamine and a small amount of ammonium chloride is added thereto.

7. A process in accordance with claim 2 in which the solution contains para-butylaminobenzoyl-dimethylaminoethanol and to which a small amount of ammonium chloride is added.

8. A process in accordance with claim 2 in which the solution contains the sodium salt of dimethylaminomethylphenyl-phosphinic acid and to which a small amount of secondary sodium phosphate is added.

JOSEF EISENBRAND.
HERMANN PICHER.